(12) United States Patent
Kim et al.

(10) Patent No.: US 8,422,131 B2
(45) Date of Patent: Apr. 16, 2013

(54) LIQUID ELASTIC MEMBRANE PRISM AND 3 DIMENSION DISPLAY DEVICE HAVING THE SAME

(75) Inventors: Hwi Kim, Seoul (KR); Hae-Young Yun, Suwon-si (KR); Jiangang Lu, Suwon-si (KR); Kyung-Ho Jung, Yongin-si (KR); Seung-Hoon Lee, Hwaseong-si (KR); Jung-hwan Yi, Seoul (KR); Hee-Seop Kim, Hwaseong-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 443 days.

(21) Appl. No.: 12/784,167

(22) Filed: May 20, 2010

(65) Prior Publication Data

US 2011/0109964 A1 May 12, 2011

(30) Foreign Application Priority Data

Nov. 6, 2009 (KR) .......................... 10-2009-0107225

(51) Int. Cl.
*G02B 27/22* (2006.01)
*G02B 5/06* (2006.01)

(52) U.S. Cl.
USPC ........... 359/463; 359/462; 359/665; 359/832; 348/59

(58) Field of Classification Search .................. 359/462, 359/463, 665, 832; 348/54, 59; 346/6; 345/6, 345/7
See application file for complete search history.

(56) References Cited

U.S. PATENT DOCUMENTS

| 7,187,344 B2 * | 3/2007 | Feenstra et al. .................... 345/6 |
| 7,245,430 B2 * | 7/2007 | Kobayashi et al. ............ 359/464 |
| 7,474,470 B2 * | 1/2009 | Cernasov ....................... 359/665 |

* cited by examiner

*Primary Examiner* — Audrey Y Chang
(74) *Attorney, Agent, or Firm* — F. Chau & Associates, LLC

(57) ABSTRACT

A stereoscopic display is provided. The stereoscopic display is able to control a viewing position and make a viewing angel wide. On top of a display panel, an image is provided through a plurality of pixels and is separated to a left-eye image and a right-eye image by a lenticular lens. An elastic membrane prism array controls an angle of emitted light. An elastic membrane prism array is disposed on the lenticular lens or on and under the lenticular lens. The elastic membrane prism array includes a prism body having a first chamber and a second chamber, a wall disposed between the first and second chamber, a prism plate connected to the wall, a piston adapted for moving back-and-forth and a transporting tube disposed between the piston and the prism body.

17 Claims, 26 Drawing Sheets

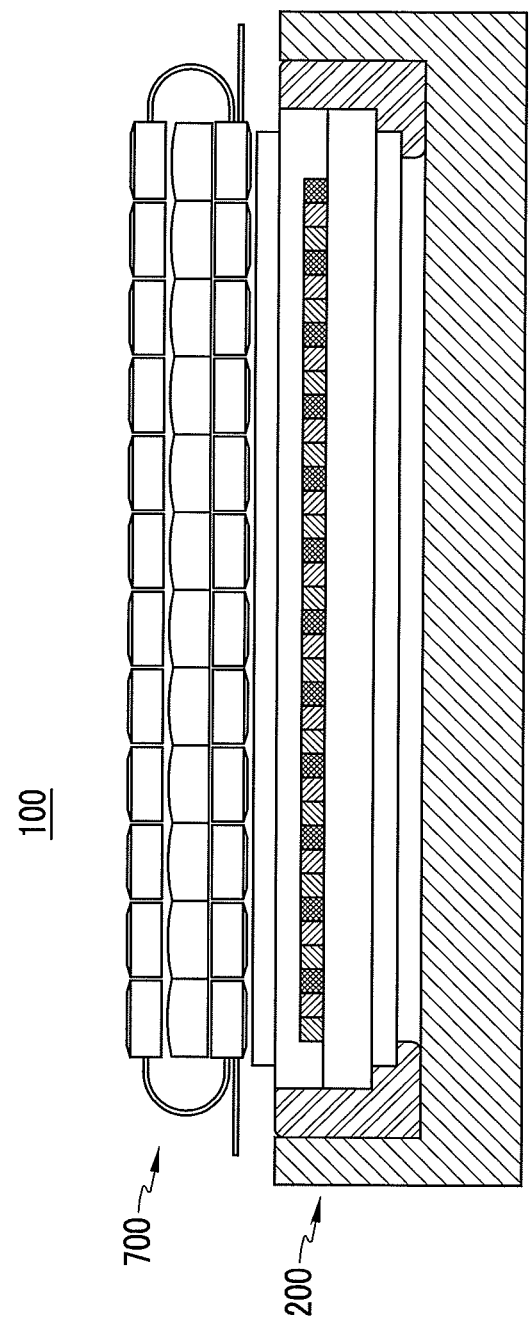

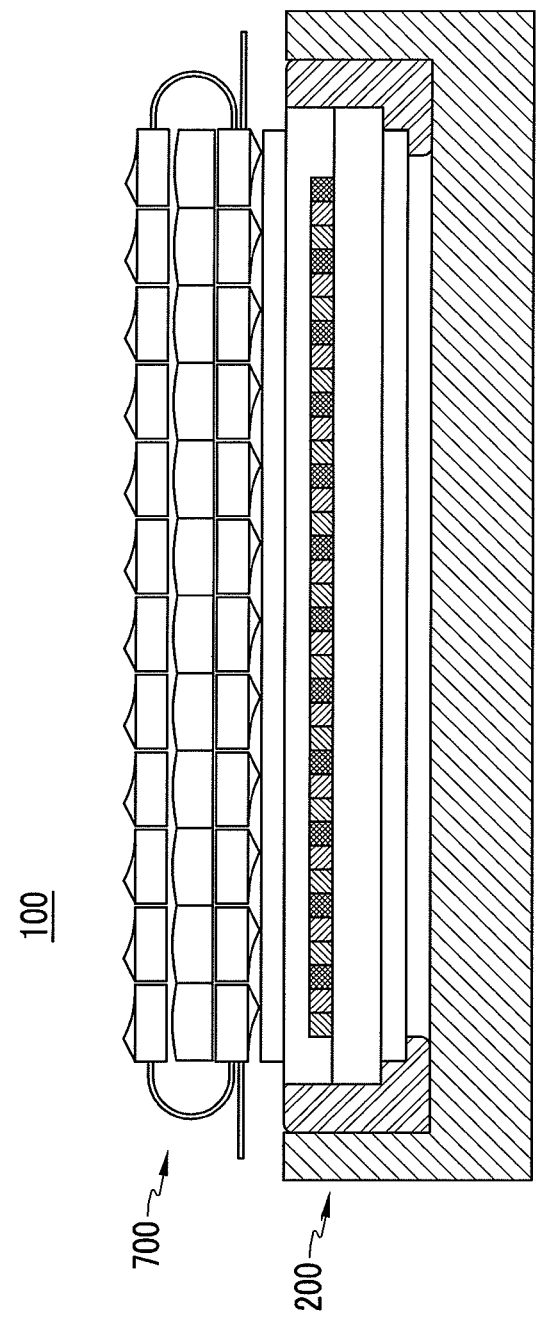

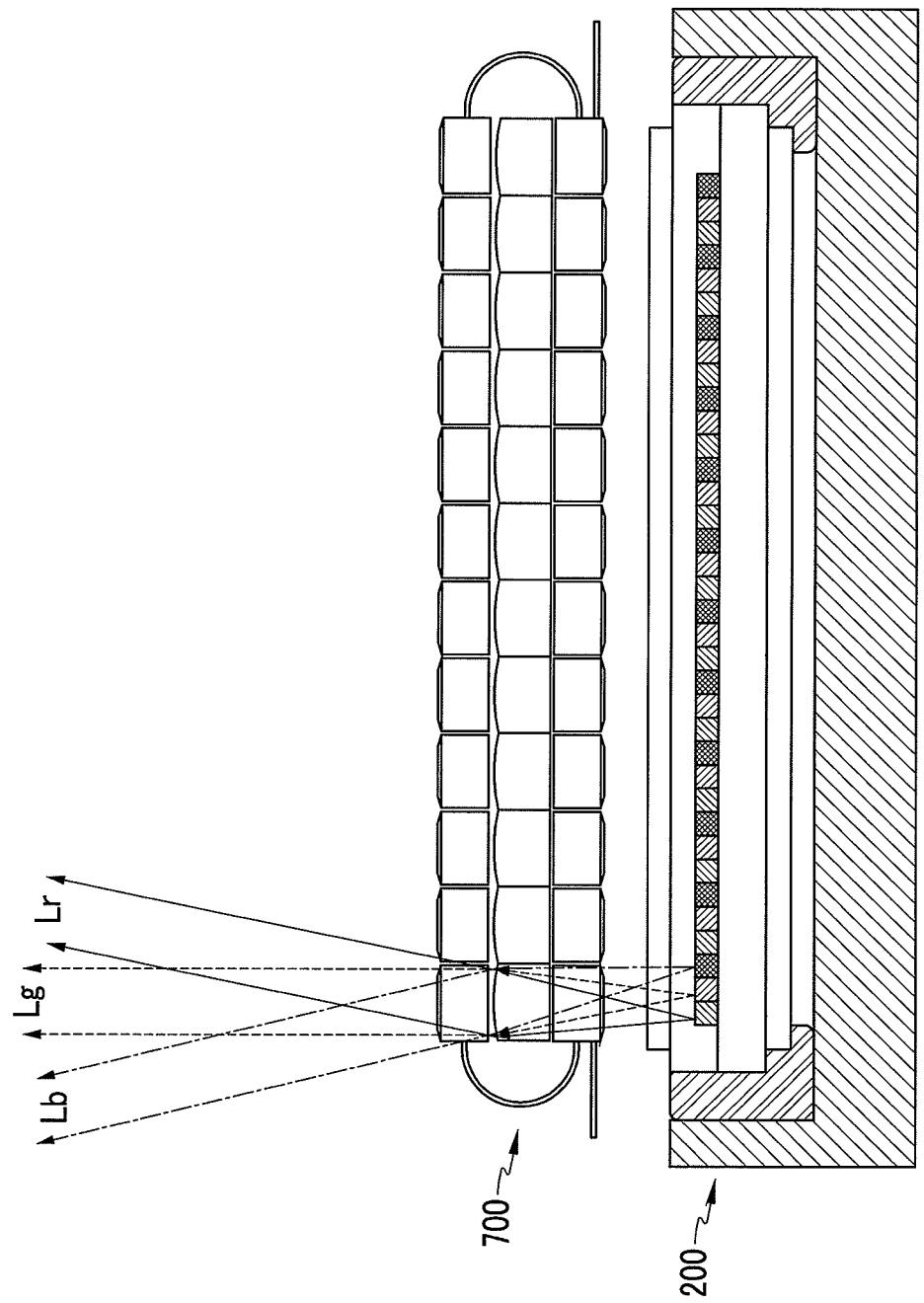

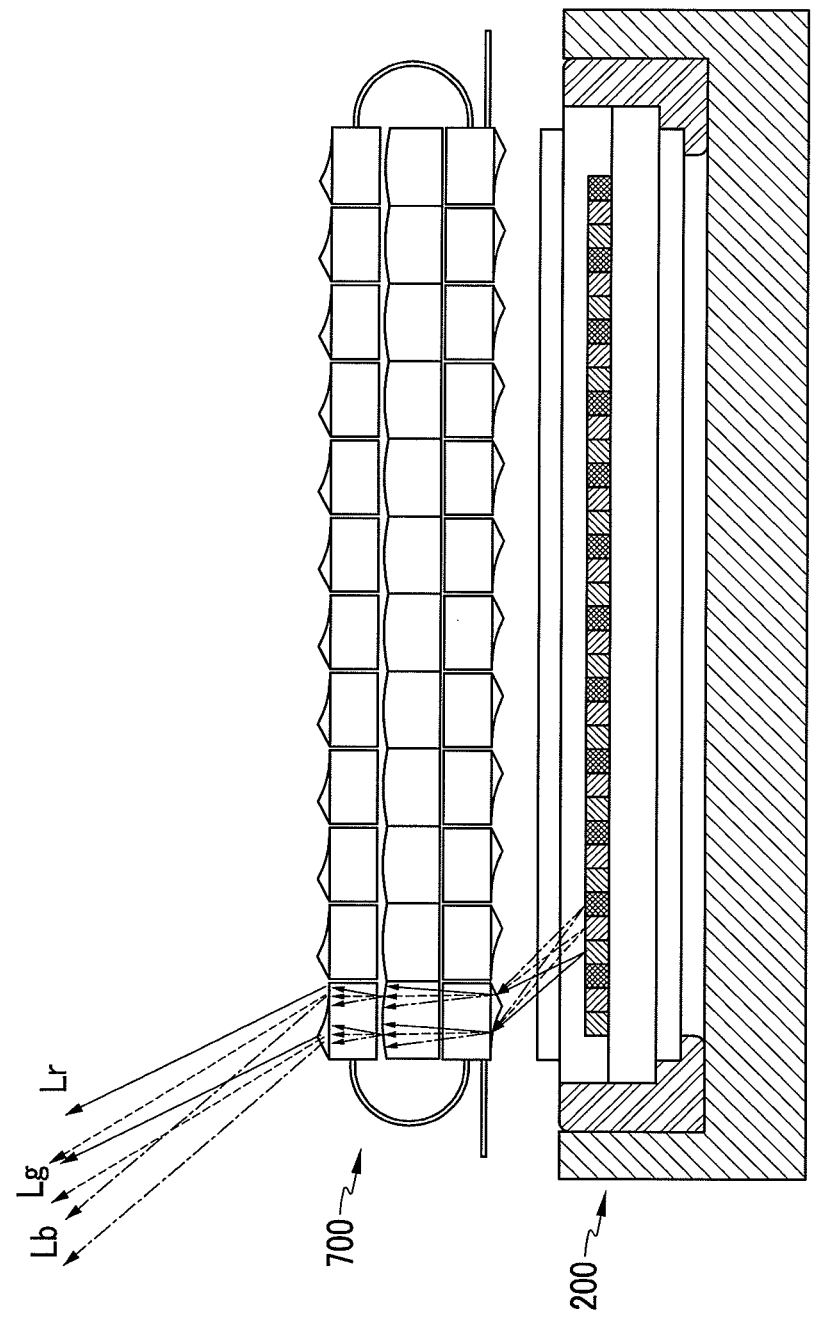

LIQUID ELASTIC MEMBRANE PRISM AND 3 DIMENSION DISPLAY DEVICE HAVING THE SAME

CROSS-REFERENCE TO RELATED APPLICATION

This application claims priority to Korean Patent Application No. 10-2009-0107225 filed on Nov. 6, 2009 and all the benefits accruing therefrom under 35 U.S.C. §119, the contents of which are herein incorporated by reference in its entirety.

BACKGROUND

1. Field of the Invention

The present disclosure relates to a liquid elastic membrane prism and 3-dimensional display device capable of increasing number of view point and improving visibility.

2. Description of the Related Art

Stereoscopic displays provide a stereoscopic image based on binocular parallax by separating an original image into a left-eye image and a right-eye image and providing the separated left-eye image and right-eye image to a viewer's left and right eyes, respectively. Stereoscopic displays are roughly divided into displays using glasses and glassless displays. Displays using glasses have a disadvantage in that a user must wear special viewing aids such as polarization glasses. To solve this problem, glassless displays have been developed, which separate an original image into a left-eye image and a right-eye image using a three-dimensional (3D) optical plate, such as a parallax barrier or a lenticular lens sheet, disposed in front of a display panel. Accordingly, a viewer can see a 3D image without special viewing aids. However, such conventional 3D displays using a parallax barrier or lenticular lens sheet suffer from color separation and black stripes.

FIG. 1 is a perspective view illustrating why color separation occurs in a conventional glassless stereoscopic display. Referring to FIG. 1, the conventional glassless stereoscopic display includes a display panel 10 displaying an image, and a 3D optical plate 15 separating the image displayed by the display panel 10 into a left-eye image and a right-eye image. The display panel 10 includes a plurality of pixels 11, each composed of red (R), green (G), and blue (B) colored sub pixels. The pixels 11 display left-eye images L 1 and L 2 and right-eye images R 1 and R 2 in an alternating pattern. The left-eye images L 1 and L 2 and the right-eye images R 1 and R 2 displayed by the pixels 11 are enlarged by the 3D optical plate 15, such as a lenticular lens sheet, to be respectively focused on a viewer's left eye and right eye within a viewing distance. Since the RGB sub pixels arranged in an X-direction are also enlarged and focused at the viewing distance, when the viewer moves his head in the X-direction, colors in the image are separated into red (R), green (G), and blue (B) components. Accordingly, the red (R) looks stronger when the viewer is in a position "A", the green (G) looks stronger when the viewer is in a position "B", and the blue (B) looks stronger when the viewer is in a position "C". Such a phenomenon is referred to as color separation, and hinders the viewer from seeing a natural 3D image. Although the 3D optical plate 15 shown in FIG. 1 is a lenticular lens sheet, a parallax barrier can produce the same effect.

BRIEF SUMMARY

In accordance with an exemplary embodiment, a stereoscopic display device may includes a display panel which displays an image, a three-dimensional optical plate separating the image into a left-eye image and a right-eye image; and an elastic membrane prism array including liquid material.

The elastic membrane prism array may include a prism body having a first chamber and a second chamber, a wall disposed between the first and second chamber, a prism plate connected to the wall, a piston adapted for moving back-and-forth and a transporting tube disposed between the piston and the prism body.

The liquid material may include index-matching oil.

The three-dimensional optical plate includes a lenticular lens or a microlens array.

The elastic membrane prism array may include a first elastic membrane prism array disposed between the display panel and the three dimensional plate and a second elastic membrane prism array disposed on the three dimensional plate.

The first chambers may be connected each other, the second chambers may be connected each other, respectively.

The first chamber and the second chamber may be separated.

A first prism plate of the first elastic membrane prism array and a second prism of the second elastic membrane prism array may be substantially parallel each other.

The elastic membrane prism array may include a first elastic membrane prism array disposed on the three dimensional plate.

The display panel includes a time-devided driving display device.

A stereoscopic optical module may include a three-dimensional optical plate separating an image into a left-eye image and a right-eye image; and an elastic membrane prism array including a plurality of elastic membrane prism.

The elastic membrane prism array comprises a prism body having a first chamber and a second chamber, a wall disposed between the first and second chamber, a prism plate connected to the wall, a piston adapted for moving back-and-forth and a transporting tube disposed between the piston and the prism body.

BRIEF DESCRIPTION OF THE DRAWINGS

Exemplary embodiments can be understood in more detail from the following description taken in conjunction with the accompanying drawings, in which:

FIG. 2B is a front view of an elastic membrane prism in accordance with the exemplary embodiment;

FIG. 7 is a front view of a stereoscopic display device having a three-dimension optical plate and a display panel.

FIG. 8 is a front view of operational exemplary embodiment of a stereoscopic display device of FIG. 7;

FIG. 9 is a front view of a light path of FIG. 7;

FIG. 10 is a front view illustrating a light path of FIG. 8;

DETAILED DESCRIPTION OF EMBODIMENTS

The embodiments of the invention will be described below with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
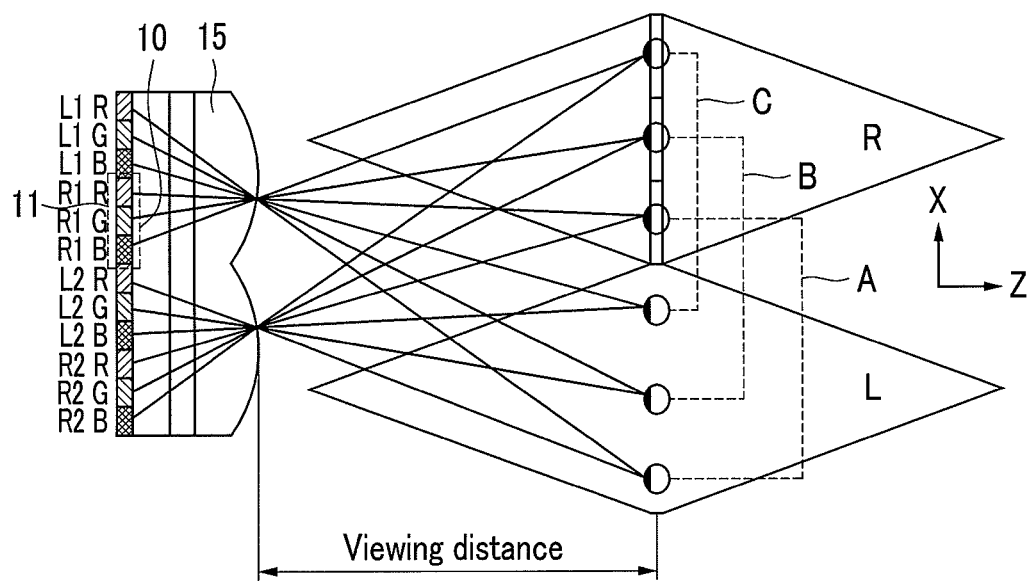
FIG. 1 is a perspective view illustrating why color separation occurs in a conventional glassless stereoscopic display in a prior art.
Figure 2A:
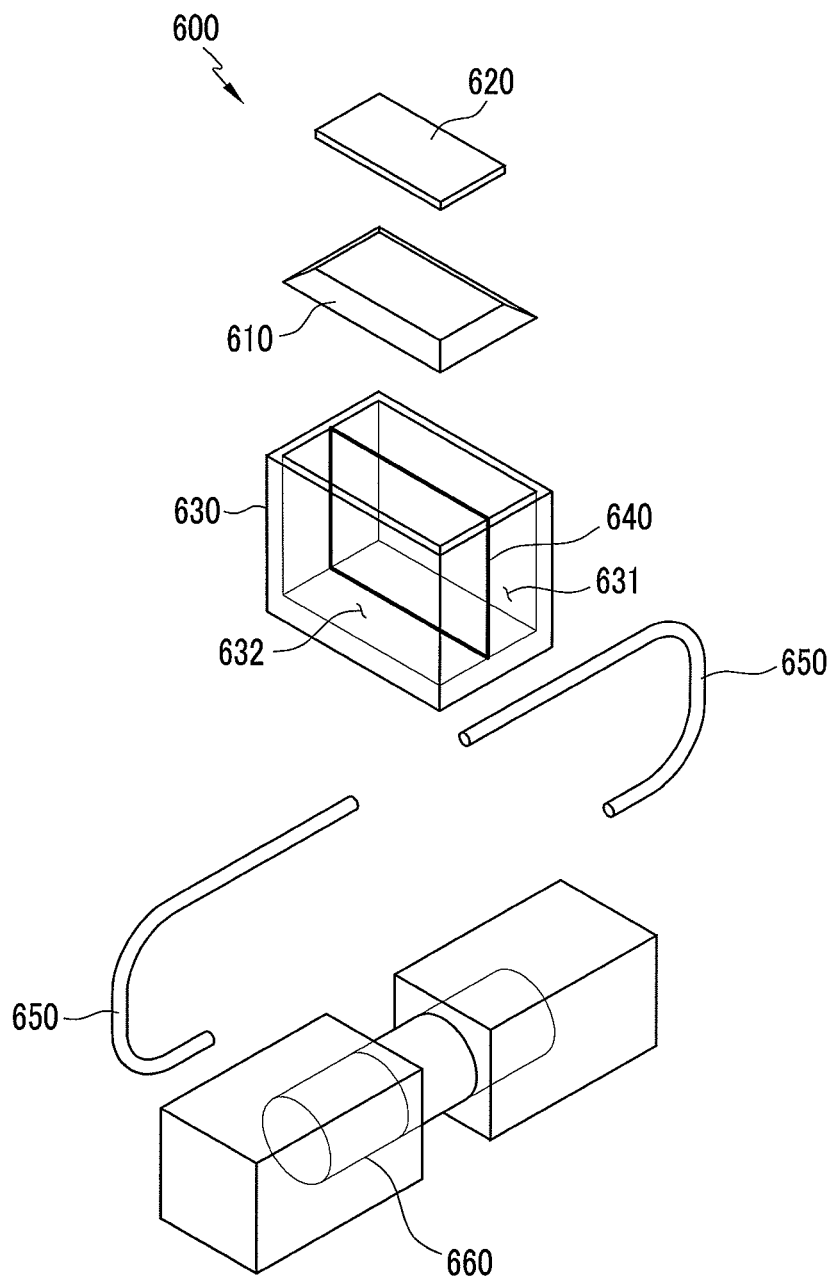
FIG. 2A and FIG. 2B is elements of an elastic membrane prism in accordance with the exemplary embodiment.
Figure 2B:
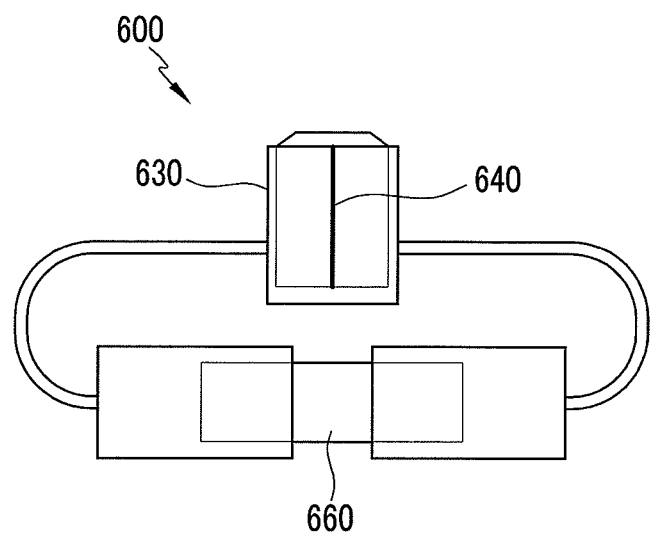
Figure 2C:
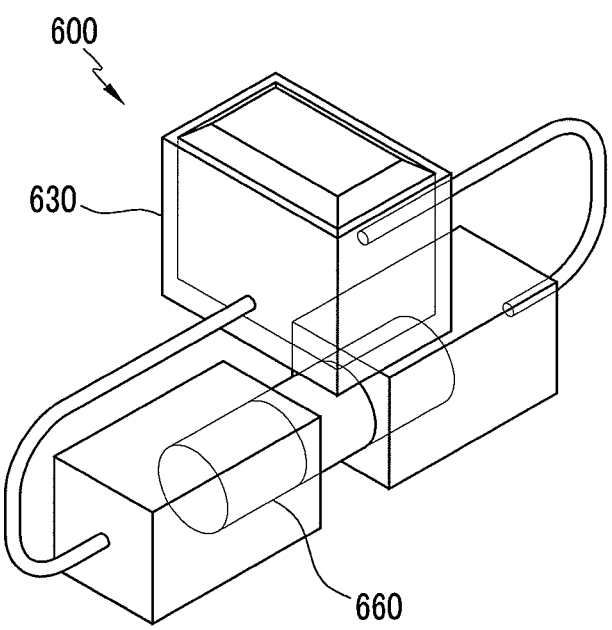
FIG. 2C is a perspective view illustrating an elastic membrane prism in accordance with the exemplary embodiment.

FIG. 2A, FIG. 2B and FIG. 2C show elements of an elastic membrane prism in accordance with the exemplary embodiment. The elastic membrane prism 600 includes a prism plate 620, an elastic membrane 610, a first chamber 631, a second chamber 632, a prism body 630, a wall 640 which separates the first chamber 631 and the second chamber 632, a piston 660 which is capable of moving back-and-forth, and a transporting tube 650 connecting a piston and the prism body. The first and second chamber 631, 632 and the transporting tube 650 contains liquid material. The liquid material may be oil such as index-matching oil. The refractive index of liquid material is the same as or similar to that of the prism plate 620. The liquid material in the first chamber 631 cannot be mixed with the liquid material in the second chamber 632. The wall is connected to the prism plate 620 and the prism plate 620 can be rotated in some degree with reference to the wall 640. The elastic membrane 610 may provide a dynamic stability to the elastic membrane prism 600 and prevent leakage of the liquid material in the first and second chambers 631, 632.

Figure 3A:
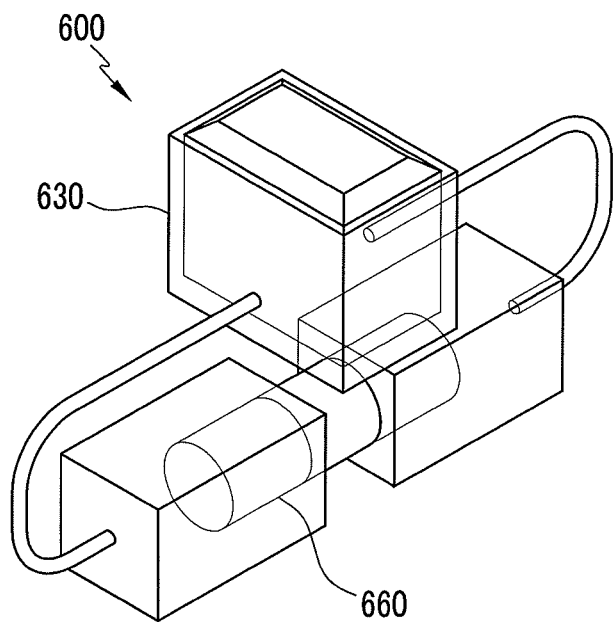
FIG. 3A is a perspective view illustrating a prism plate of an elastic membrane prism disposed parallel.
Figure 3B:
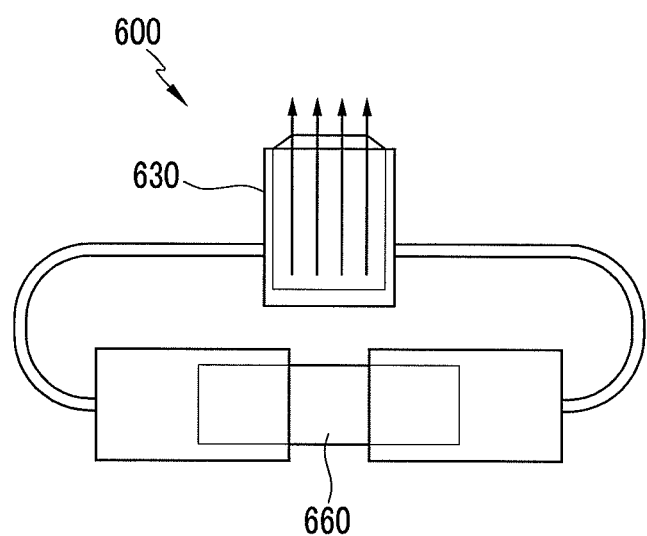
FIG. 3B is a front view illustrating a light path of FIG. 3A.
Figure 3C:
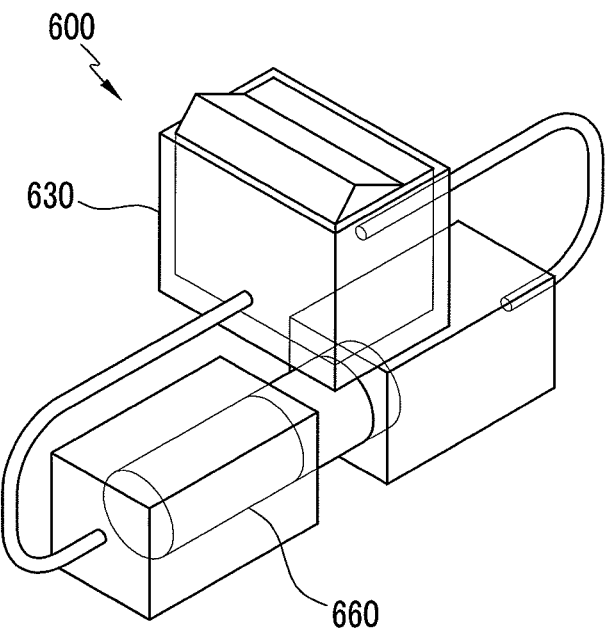
FIG. 3C is a perspective view illustrating a prism plate inclined in a first direction.
Figure 3D:
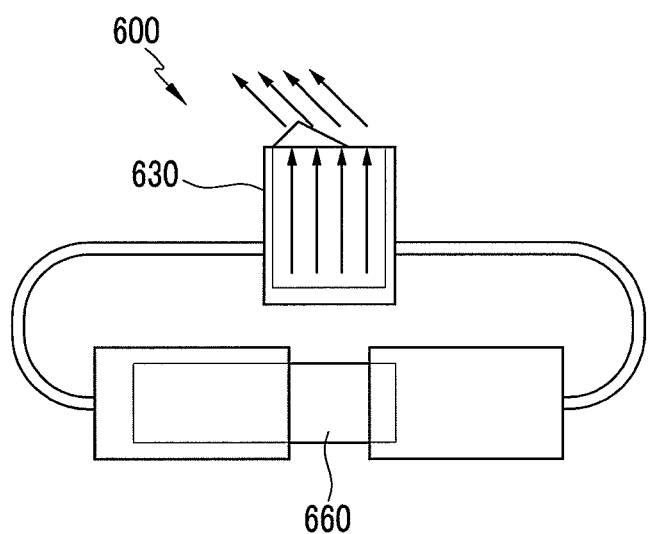
FIG. 3D is a front view illustrating a light path of FIG. 3C.
Figure 3E:
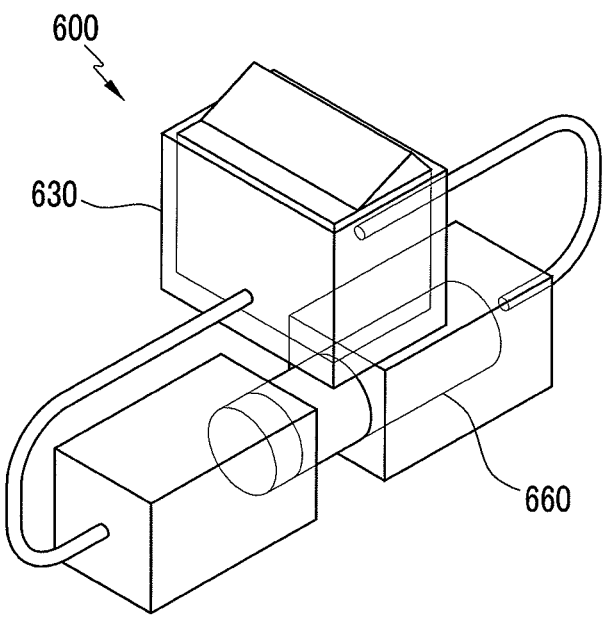
FIG. 3E is a perspective view illustrating a prism plate inclined in a second direction.
Figure 3F:
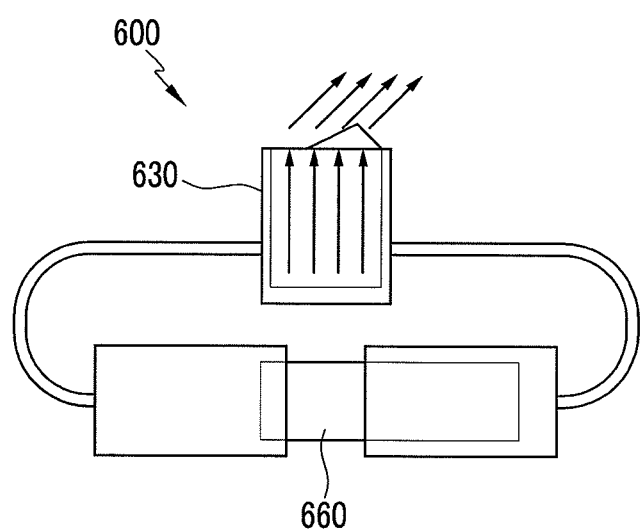
FIG. 3F is a front view illustrating a light path of FIG. 3E.
Figure 4A:
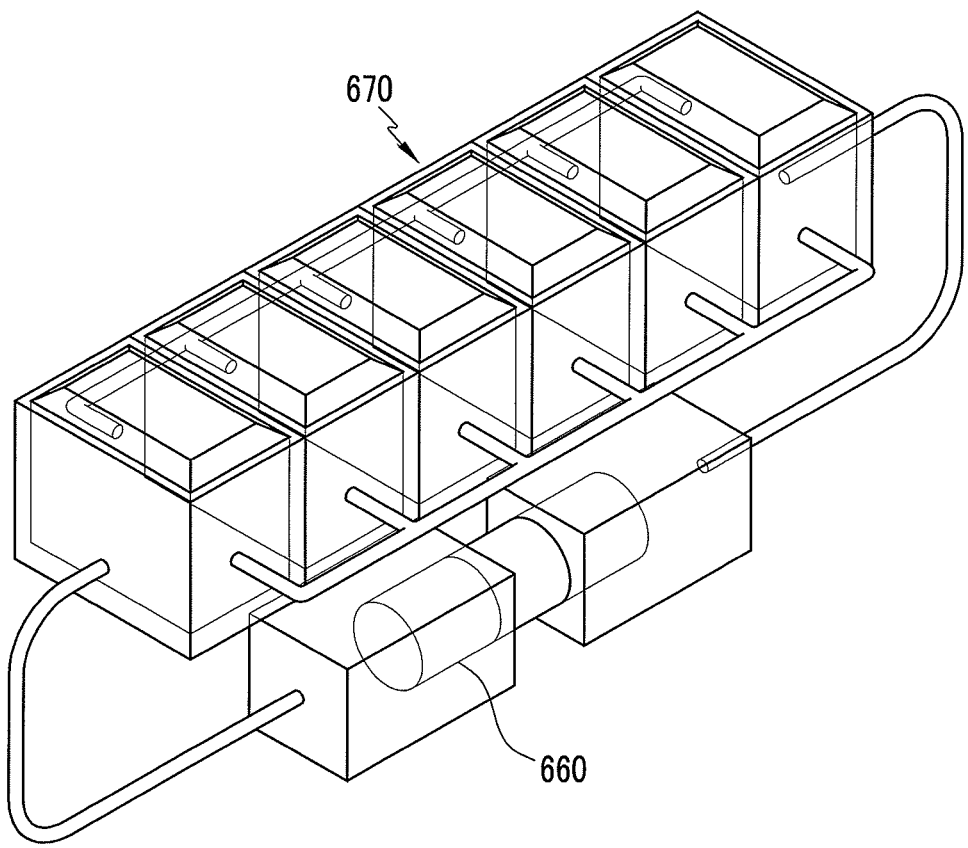
FIG. 4A to FIG. 4F is perspective views and light paths of an elastic membrane prism array.
Figure 4B:
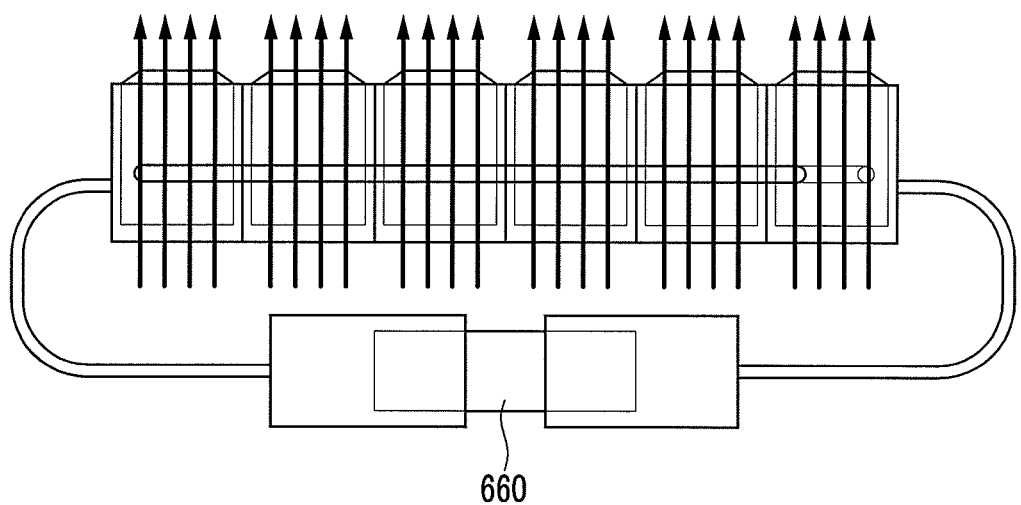
Figure 4C:
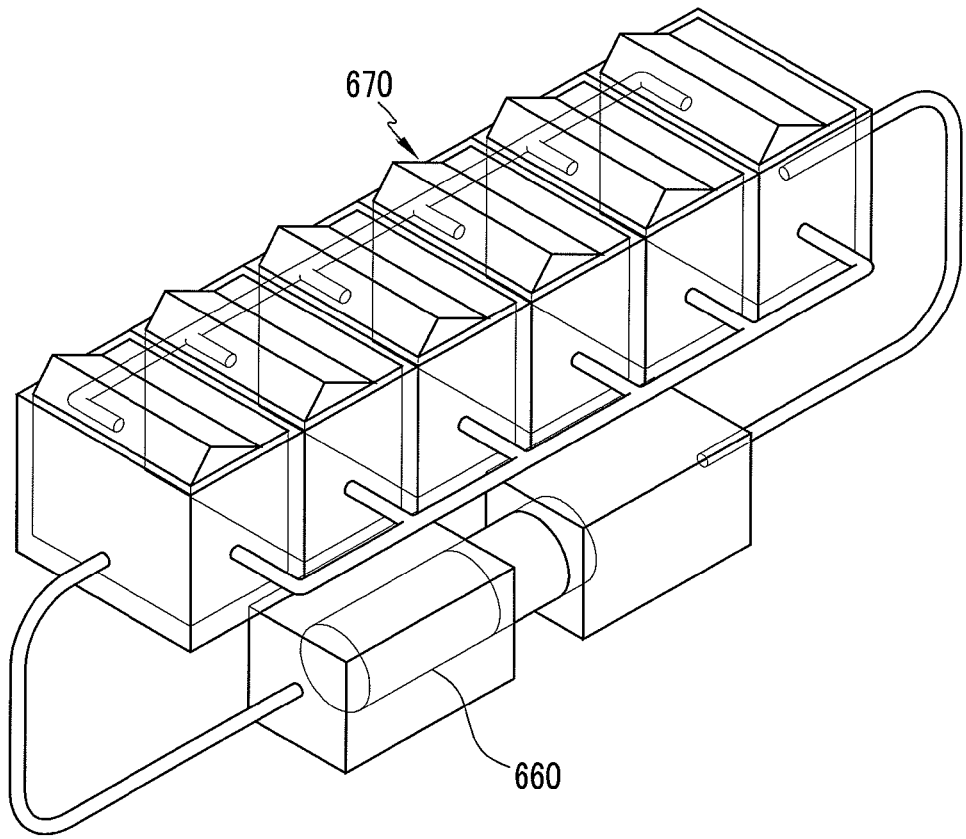
Figure 4D:
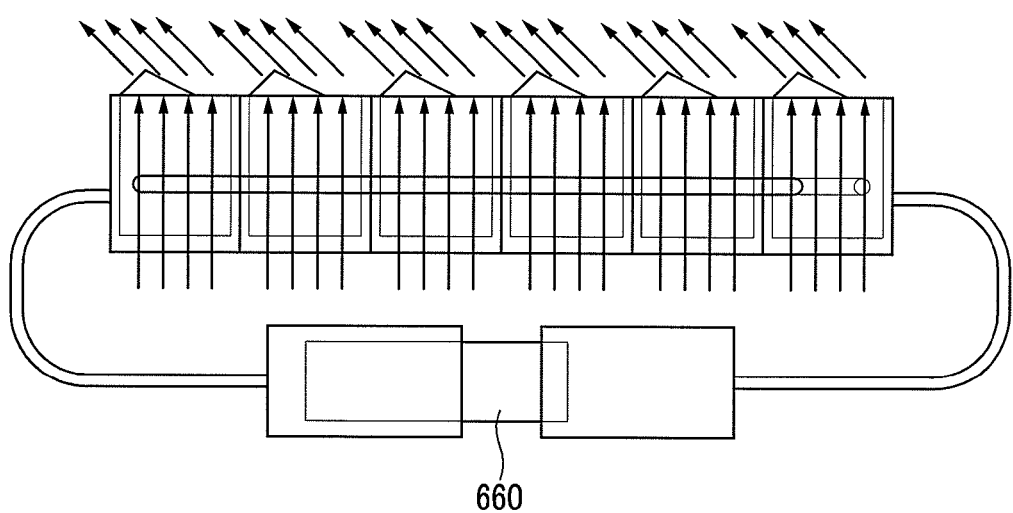
Figure 4E:
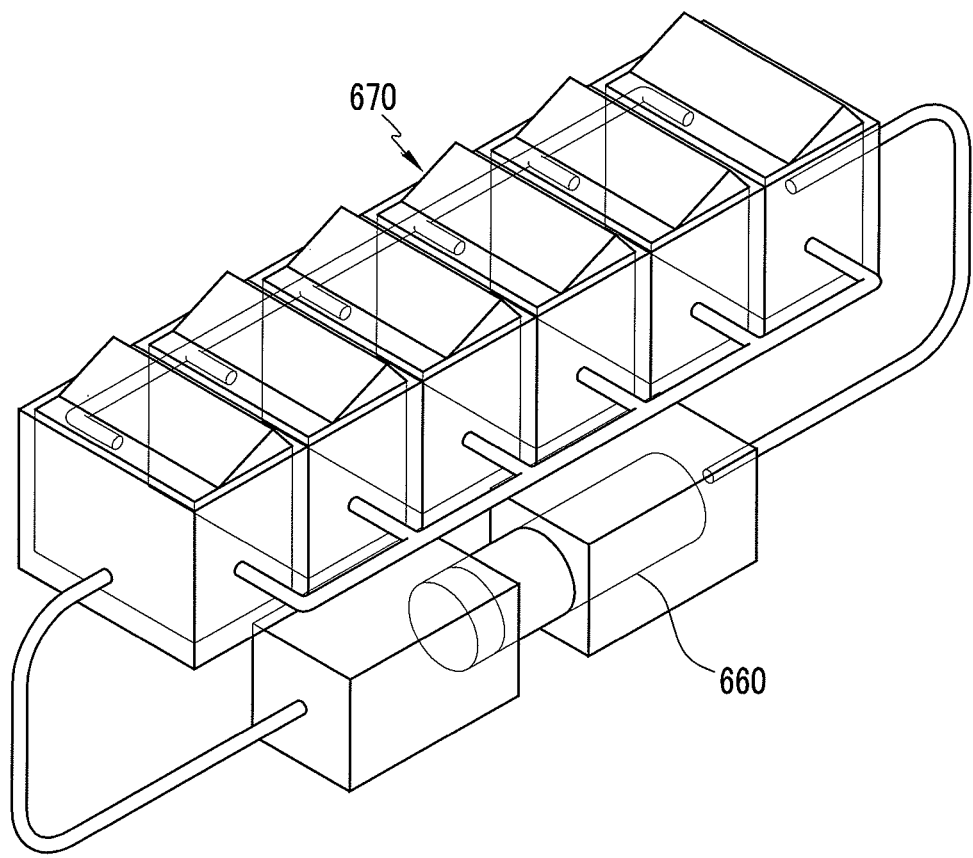
Figure 4F:
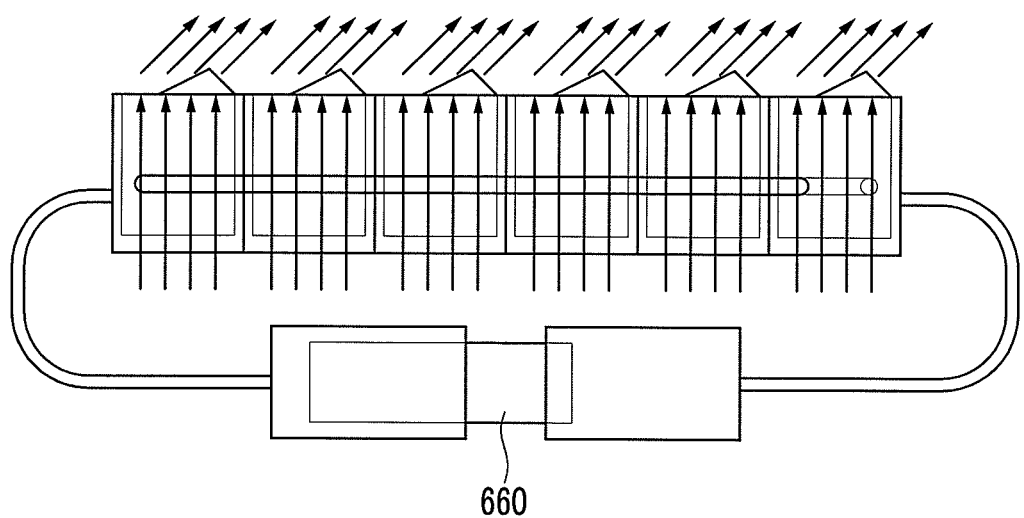

FIG. 3A is a perspective view illustrating a prism plate of an elastic membrane prism disposed parallel. The prism plate 620 holds horizontal when a piston 660 is located on the center of an oil pump, because the pressure of the first chamber is substantially equal to that of the second chamber. As shown in FIG. 3B, the direction of incident light is not changed after passing through the prism plate 620. As shown in FIG. 3C, when the prism plate 620 is inclined in a first direction by moving the piston 660 into the first chamber direction, the direction of light is changed into a second direction after passing through the prism plate. According to the inclination angle of the prism plate 620, the direction of light is determined. FIG. 3E is a perspective view illustrating a prism plate inclined in another direction. FIG. 3F is a front view illustrating a light path of FIG. 3E.

As shown from FIG. 3A to FIG. 3F, according to the position of the piston 660, an angle of the prism plate 620 may be controlled. The light path may be controlled by the angle of the prism plate 620.

FIG. 4A to FIG. 4F is perspective views and light paths of an elastic membrane prism array 670. The first chambers 631 are connected each other by the transporting tube 670. The optical characteristics of this elastic membrane prism array 670 according to the operation are illustrated FIG. 4B, FIG. 4D and FIG. 4F.

Figure 5:
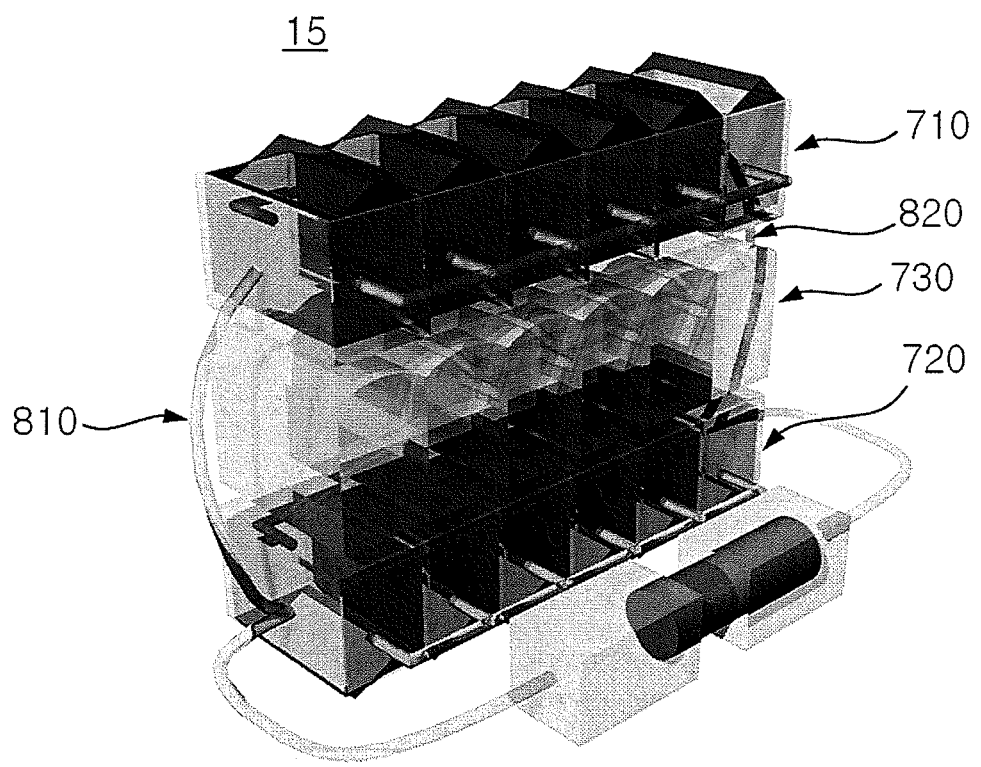
FIG. 5 is 3D optical module according to an exemplary embodiment.

FIG. 5 shows a three-dimensional optical module 15 according to an exemplary embodiment. The three-dimensional optical module 15 includes an upper elastic membrane prism array 710, a lower elastic membrane prism array 720 and a lenticular lenses 730 between the upper and lower elastic membrane prism array 710, 720. A first connecting tube 810 connects the first chambers to each other and a second connecting tube 820 connects the second chambers to each other.

Figure 6A:
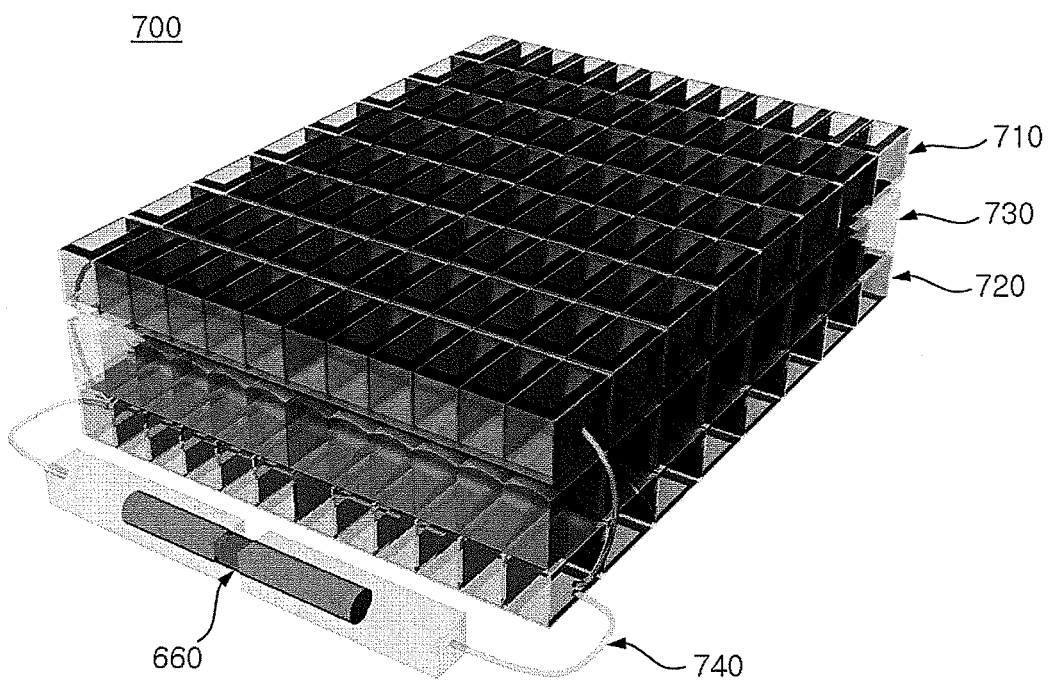
FIG. 6A to FIG. 6C is 3D optical module having m×n prism array.
Figure 6B:
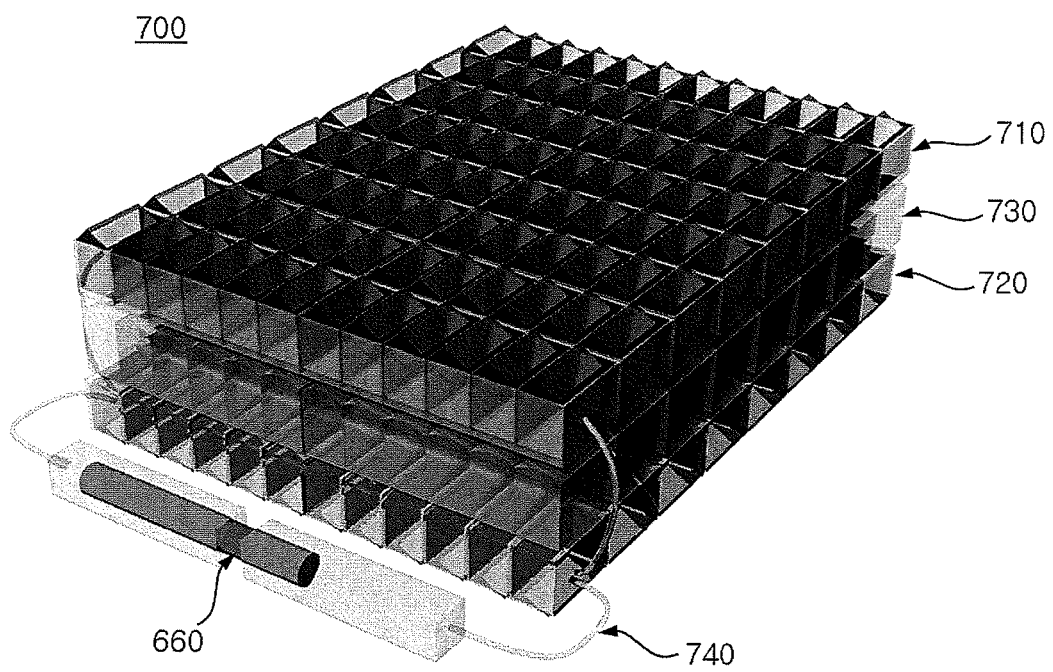
Figure 6C:
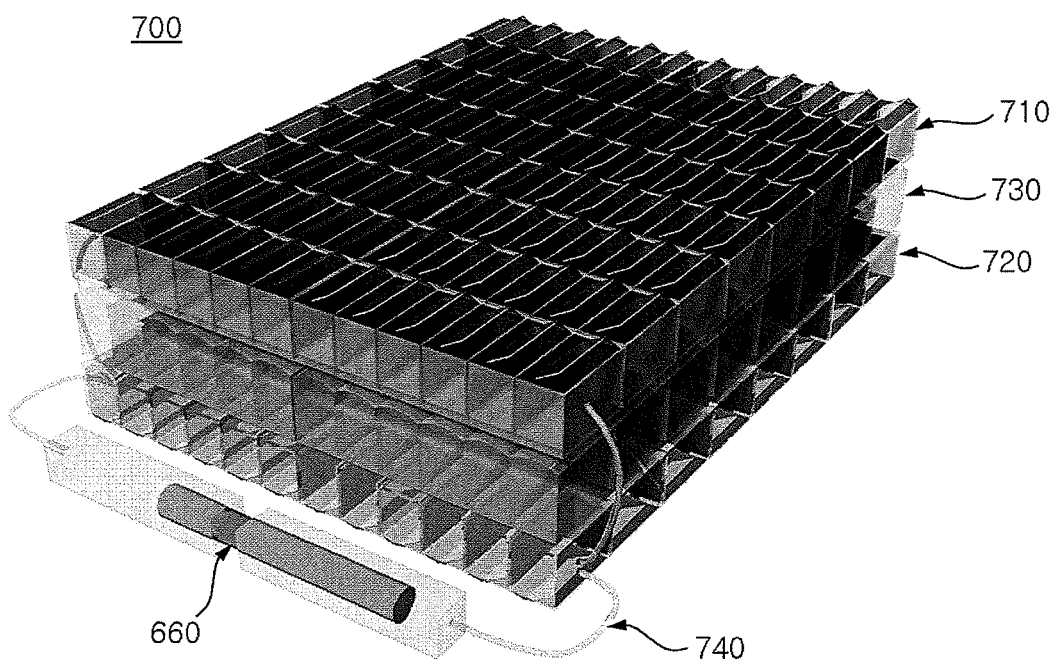

FIG. 6A, FIG. 6B, and FIG. 6C show a three-dimensional optical module array 700. The inclination of the prism plate 620 is controlled by the position of the piston 660. When the piston 660 moves toward the first chamber 631 side, a portion of the prism plate 620 overlapping the first chamber 631 goes upward and a portion of the prism plate 620 overlapping the second chamber 632 goes downward. When the piston 660 moves toward the second chamber 632 side, a portion of the prism plate 620 overlapping the second chamber 632 goes upward and a portion of the prism plate 620 overlapping the first chamber 631 goes downward. The three-dimensional optical module array 700 includes m×n prism array. (m>1, n>1) When the prism plate 620 is disposed in parallel with a surface of the display device, red, green, and blue lights respectively propagate along paths Lr, Lg, Lb of FIG. 9.

FIG. 7 shows a front view of a stereoscopic display device 100 having a three-dimension optical plate 700 and a display panel 200. FIG. 8 shows a front view of operational exemplary embodiment of a stereoscopic display device 100 of FIG. 7. FIG. 9 and FIG. 10 respectively illustrate light paths Lr, Lg, Lb of FIG. 7 and FIG. 8 during displaying. When the elastic membrane prism is inclined to an angle as shown in FIG. 8, the stereoscopic display device 100 shows an image having light paths (Lr, Lg, Lb) shown in FIG. 10. As a result, the three-dimension optical plate 700 may control the light path and make a viewing angle wide.

The display panel 200 may includes a liquid crystal display (LCD), a plasma display panel (PDP), an organic light emitting diode (OLED), a light emitting diode display (LED), a cathode ray tube (CRT).

The three dimensional plate includes a lenticular lens and a microlens array. The lenticular lens and the microlens array may be made of polycarbonate and acryl.

Figure 11A:
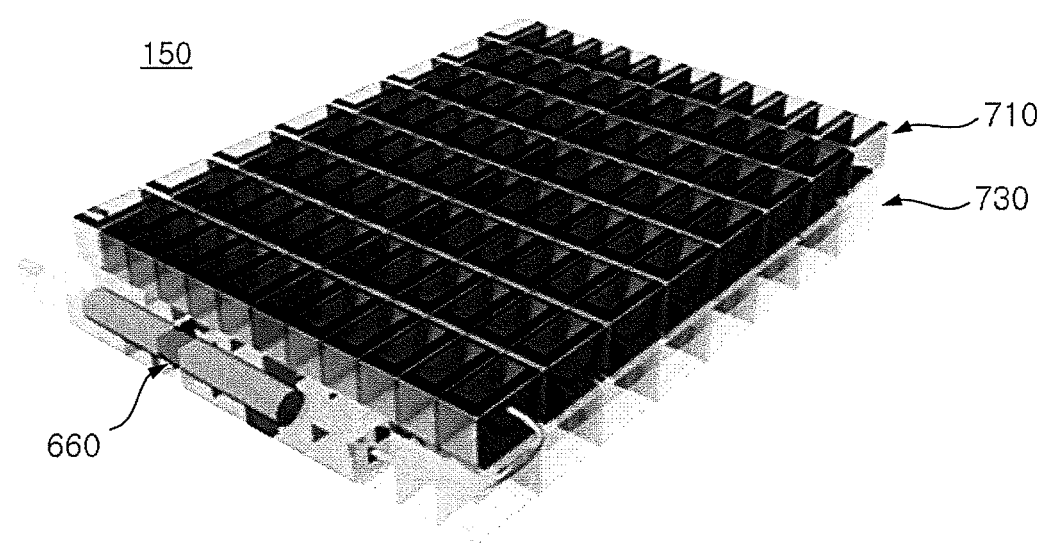
FIG. 11A is a perspective view of an exemplary embodiment having a three-dimension optical plate.
Figure 11B:
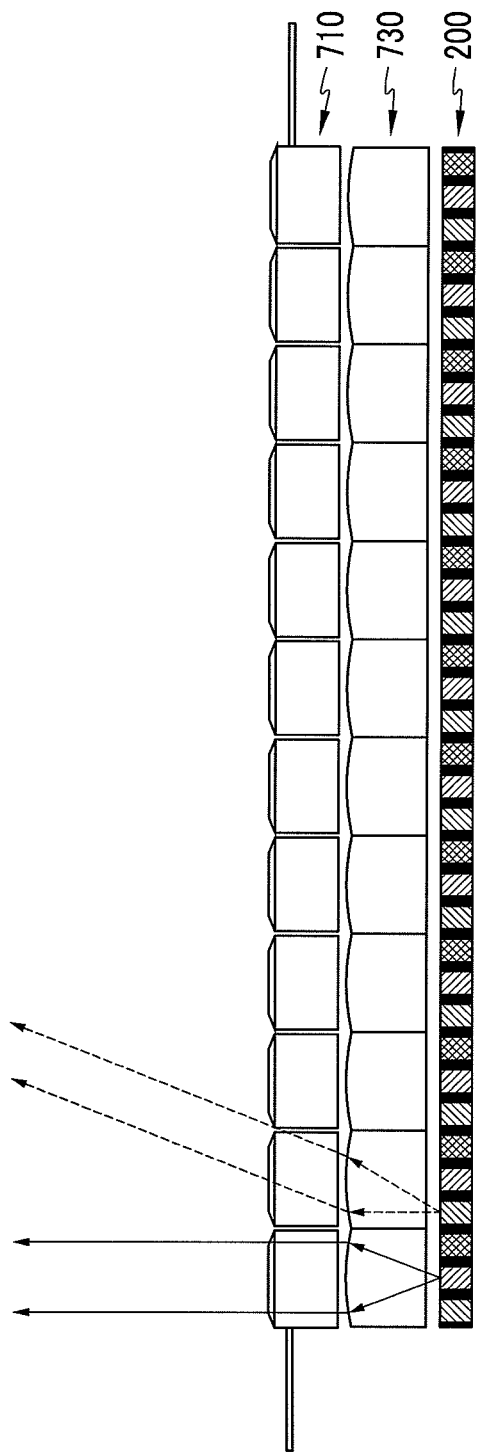
FIG. 11B is a front view of FIG. 11A illustrating a light path.
Figure 11C:
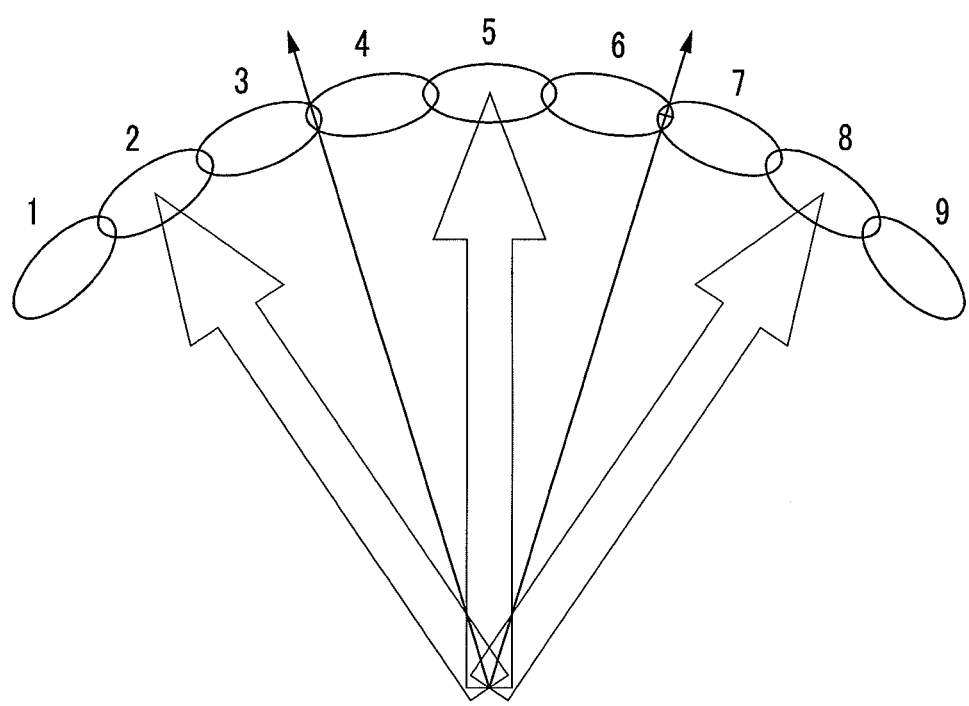
FIG. 11C is a view point of FIG. 11A.
Figure 12A:
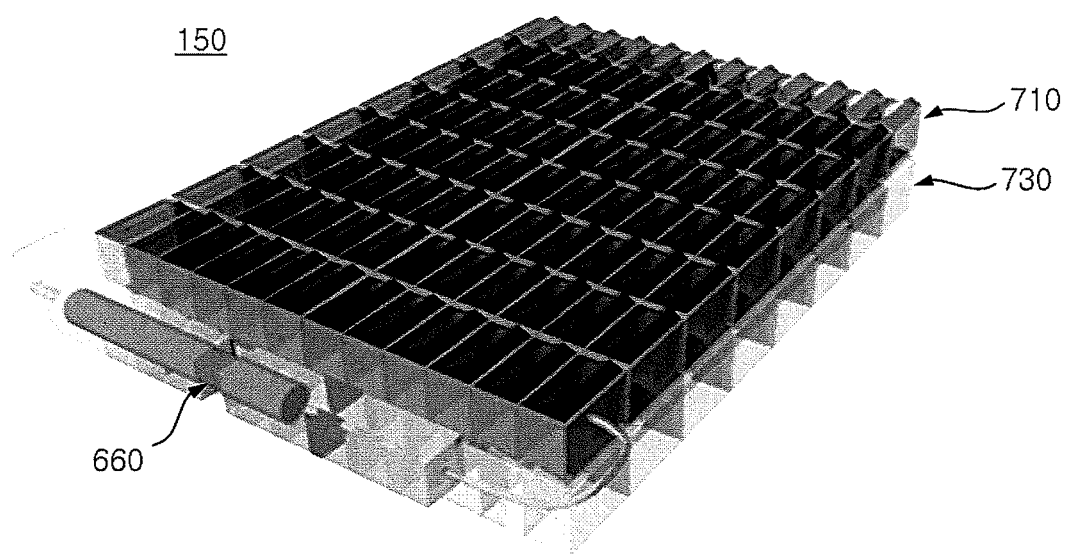
FIG. 12A is a perspective view illustrating operation of an exemplary embodiment having a three-dimension optical plate.
Figure 12B:
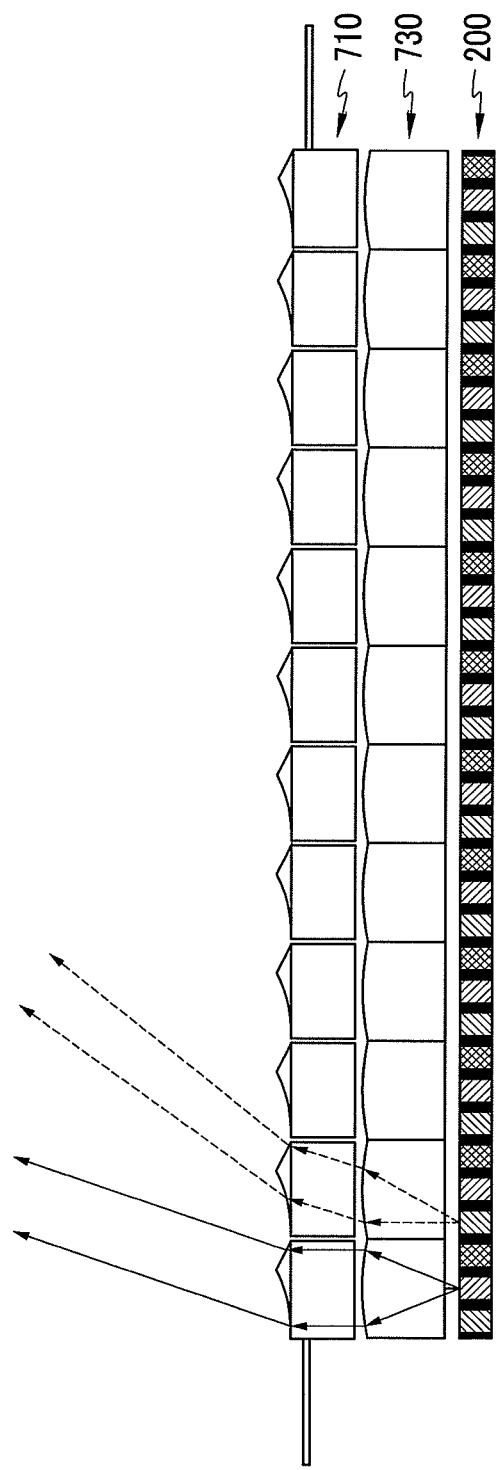
FIG. 12B is a front view of FIG. 12A illustrating a light path.
Figure 12C:
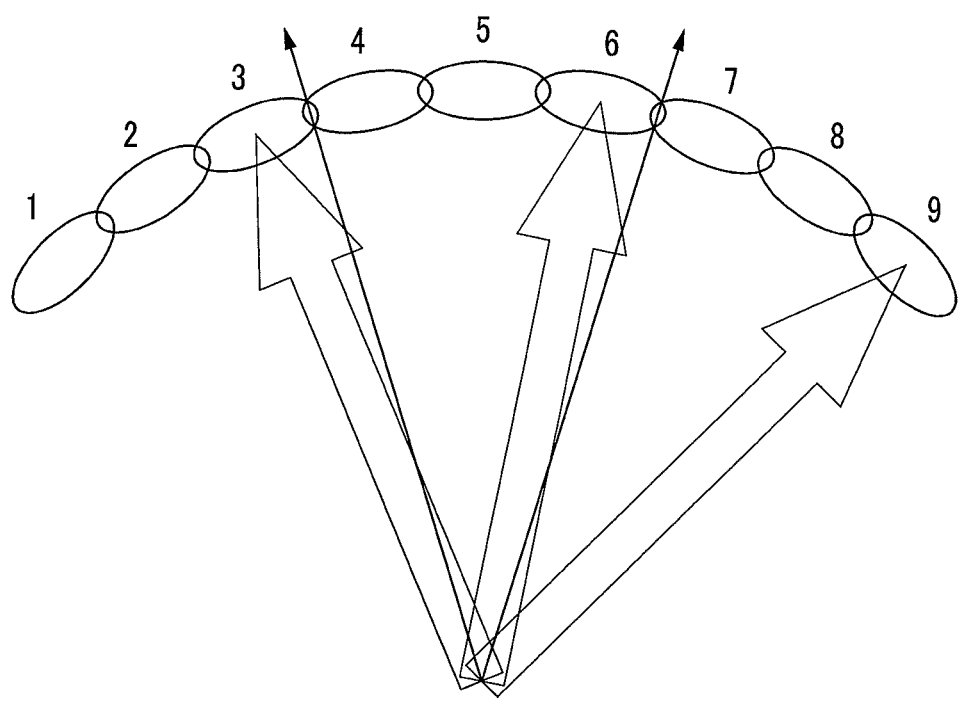
FIG. 12C is a view point of FIG. 12A.
Figure 13A:
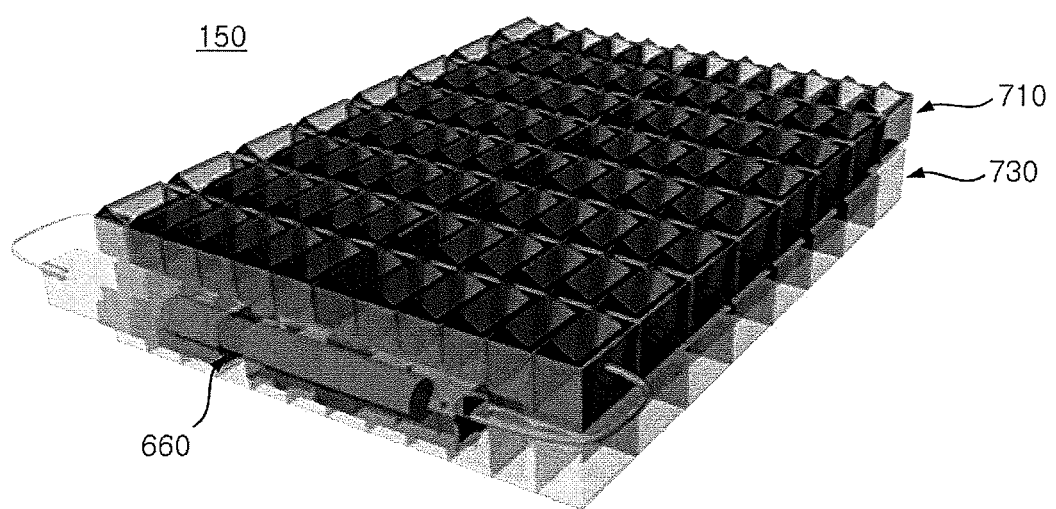
FIG. 13A is a perspective view illustrating operation of an exemplary embodiment having a three-dimension optical plate.
Figure 13B:
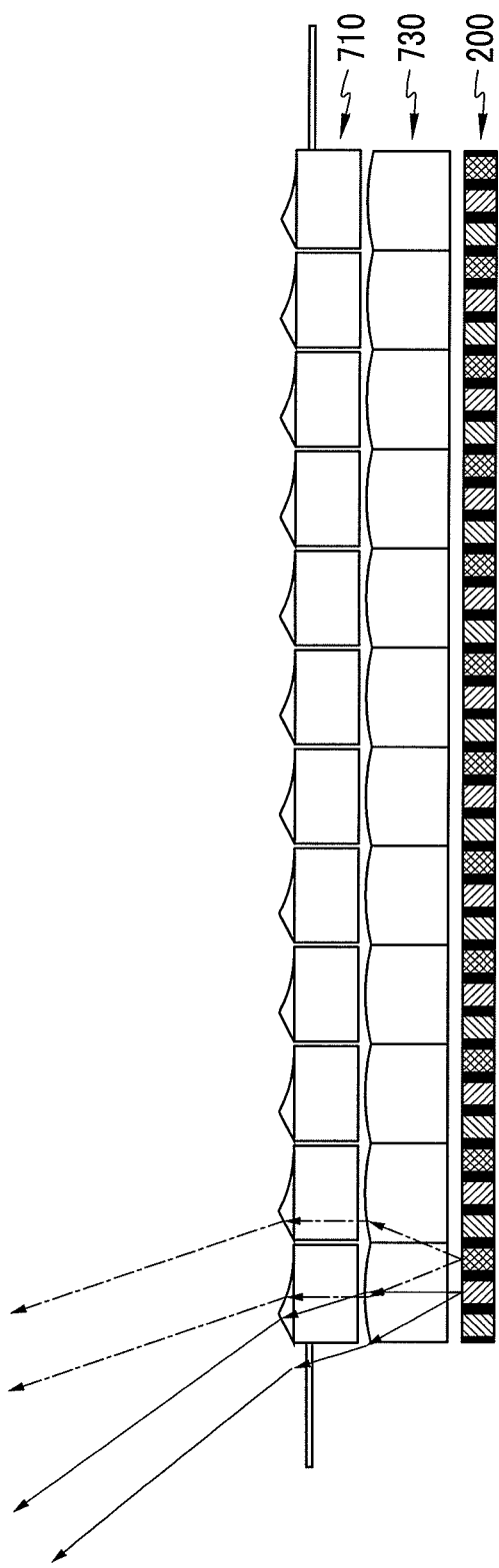
FIG. 13B is a front view of FIG. 12A illustrating a light path.
Figure 13C:
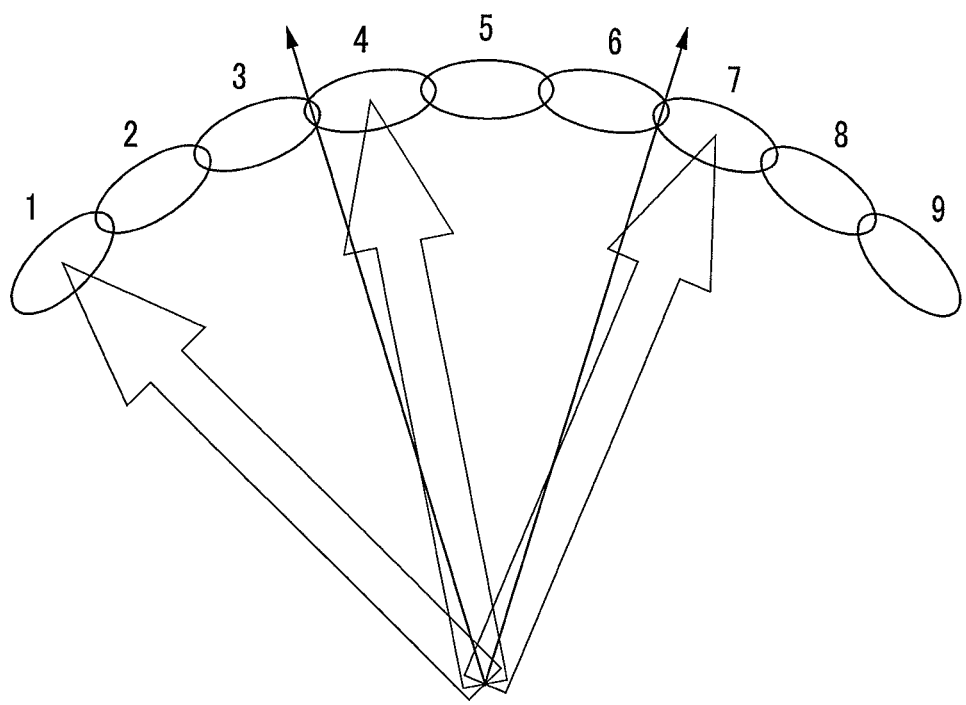
FIG. 13C is a view point of FIG. 12A.

Another exemplary embodiment will be explained with reference to FIG. 11A to FIG. 13C. A three dimensional plate 150 includes a lenticular lens 730 and an elastic membrane prism array 710 and a piston 660 controlling the operation of the elastic membrane prism array 710. FIG. 11B shows a stereoscopic display which includes the three dimensional plate 150 combined to a display panel 200. FIG. 11C shows a viewing point of the exemplary embodiment of FIG. 11A. According to the operation of the elastic membrane prism array 710, the light path will be changed. When the elastic membrane prism is located such as FIG. 11A, the viewing point of the stereoscopic display will be 2, 5, 8. When the elastic membrane prism is located such as FIG. 12A, the viewing point of the stereoscopic display will be 3, 6, 9. When the elastic membrane prism is located such as FIG. 13A, the viewing point of the stereoscopic display will be 1, 4, 7.

The display panel 200 may includes a liquid crystal display (LCD), a plasma display panel (PDP), an organic light emitting diode (OLED), a light emitting diode display (LED), a cathode ray tube (CRT), and a time divided driving display such as micro-eletro-mechanical systems (MEMS) display, time multiplexed optical shutter (TMOS) display. When the time divided driving display is used for the display device, more information will be displayed in limited displaying resolution.

The position of the elastic membrane prism array 710 is not limited only on the lenticular lens 730 or on and under lenticular lens 730. The elastic membrane prism array 710 may be disposed under the lenticular lens 730.

What is claimed is:

1. A stereoscopic display device comprising:
a display panel which displays an image,
a three-dime dimensional optical plate separating the image into a left-eye image and a right-eye image; and
an elastic membrane prism array comprising,
a liquid material,
a prism body having a first chamber and a second chamber,
a wall disposed between the first and second chamber,
a prism plate connected to the wall, wherein the prism plate is rotated by moving the liquid material with respect to the wall, via a piston adapted for moving back-and-forth, and
a transporting tube disposed between the piston and the prism body.

2. The stereoscopic display device of claim 1, wherein the liquid material comprises index matching oil.

3. The stereoscopic display device of claim 2, wherein the three-dimensional optical plate comprises a lenticular lens.

4. The stereoscopic display device of claim 1, wherein the three-dimensional optical plate comprises a lenticular lens.

5. The stereoscopic display device of claim 4, wherein the elastic membrane prism array comprises a prism body having a first chamber and a second chamber, a wall disposed between the first and second chamber, a prism plate connected to the wall, a piston adapted for moving back-and-forth and a transporting tube disposed between the piston and the prism body.

6. The stereoscopic display device of claim 4, wherein the liquid material comprises index-matching oil.

7. The stereoscopic display device of claim 1, wherein the elastic membrane prism array comprises a first elastic membrane prism array disposed on the three dimensional plate.

8. The stereoscopic display device of claim 7, wherein the display panel includes a time-divided driving display device.

9. A stereoscopic display device comprising:
a display panel which displays an image,
a three-dimensional optical plate separating the image into a left-eye image and a right-eye image; and
an elastic membrane prism array including a liquid material, wherein the elastic membrane prism array comprises a first elastic membrane prism array disposed between the display panel and the three dimensional plate and a second elastic membrane prism array disposed on the three dimensional plate.

10. The stereoscopic display device of claim 9, wherein the elastic membrane prism array comprises a prism body having a first chamber and a second chamber, a wall disposed between the first and second chamber, a prism plate connected to the wall, a piston adapted for moving back-and-forth and a transporting tube disposed between the piston and the prism body.

11. The stereoscopic display device of claim 10, wherein the first chamber comprises a plurality of sub-chambers connected to each other, the second chamber comprises a plurality of sub-chambers connected to each other and wherein the first chamber is separated from the second chamber.

12. The stereoscopic display device of claim 11, wherein a first prism plate of the first elastic membrane prism array and a second prism of the second elastic membrane prism array are substantially parallel each other.

13. The stereoscopic display device of claim 12, wherein the three-dimensional optical plate comprises a lenticular lens.

14. A stereoscopic optical module comprising:
a three-dime dimensional optical plate separating the image into a left-eye image and a right-eye image; and
an elastic membrane prism array including a plurality of elastic membrane prism, wherein the elastic membrane prism array comprises,
a liquid material,
a prism body having a first chamber and a second chamber,
a wall disposed between the first and second chambers,
a prism plate connected to the wall, wherein the prism plate is rotated by moving the liquid material with respect to the wall, via a piston adapted for moving back-and-forth, and
a transporting tube disposed between the piston and the prism body.

15. The stereoscopic optical module of claim 14, wherein the liquid material comprises index matching oil.

16. The stereoscopic optical module of claim 15, wherein the three-dimensional optical plate comprises a lenticular lens.

17. The stereoscopic optical module of claim 14, wherein the three-dimensional optical plate comprises a lenticular lens.

* * * * *